(12) United States Patent
Haimoff et al.

(10) Patent No.: US 9,510,704 B2
(45) Date of Patent: Dec. 6, 2016

(54) GARLIC PEELER

(71) Applicant: TICHKUM DISTRIBUTION OF ADVANCED CONSUMER PRODUCTS, LTD., Holon (IL)

(72) Inventors: Simon Haimoff, Jerusalem (IL); Ofer Haimov, Rishon Le Zion (IL)

(73) Assignee: TICHKUM DISTRIBUTION OF ADVANCED CONSUMER PRODUCTS, Holon (IL)

( * ) Notice: Subject to any disclaimer, the term of this patent is extended or adjusted under 35 U.S.C. 154(b) by 0 days.

(21) Appl. No.: 14/307,944

(22) Filed: Jun. 18, 2014

(65) Prior Publication Data

US 2014/0352555 A1 Dec. 4, 2014

Related U.S. Application Data

(63) Continuation of application No. 11/571,921, filed as application No. PCT/IL2005/000826 on Aug. 2, 2005, now abandoned.

(30) Foreign Application Priority Data

Aug. 5, 2004 (IL) .......................................... 163363

(51) Int. Cl.
*A23N 7/00* (2006.01)
*A23N 7/08* (2006.01)
(Continued)

(52) U.S. Cl.
CPC ................ *A47J 17/14* (2013.01); *A23N 15/08* (2013.01); *A47J 17/18* (2013.01); *A47J 17/20* (2013.01);
(Continued)

(58) Field of Classification Search
CPC ............ A23N 5/002; A23N 7/02; A23N 7/00; A23N 7/026; A23N 4/04; A23N 4/14; A23N 1/003; A47J 17/18; A47J 17/02; A47J 19/02; A47J 19/027; A47J 19/022
USPC ......... 99/586, 628, 540, 584, 623, 630, 629, 99/634, 541, 564, 590, 588, 593, 501, 99/502, 503; 100/213
See application file for complete search history.

(56) References Cited

U.S. PATENT DOCUMENTS 2,032,562 A * 3/1936 Burns ..................... A47J 17/04
30/113.3
2,047,819 A 9/1946 Dolan
(Continued)

FOREIGN PATENT DOCUMENTS

FR 1249671 A 3/1960

*Primary Examiner* — Dana Ross
*Assistant Examiner* — Hemant Mathew
(74) *Attorney, Agent, or Firm* — William Dippert; Laurence Greenberg; Werner Stemer (57) ABSTRACT

A garlic clove peeler comprising a housing formed with a clove receiving compartment and with a friction wall and a balloon-like complimentary peeling element made of resilient material and having a shaft that has a rotational axis and that removably connects to the housing. The peeling element being formed with a peeler surface extending adjacent the friction wall and resiliently biased in a direction facing the friction wall wherein the friction wall and the peeler surface are concentric with respect to the rotational axis of the shaft. A displacement mechanism is provided for rotating one or both of the friction wall and the peeling element about the rotational axis, wherein a gap extends between the peeler surface and the friction wall, and wherein the gap is sized so as to snugly receive one or more garlic cloves and to allow the cloves to be carried around in the gap while maintaining contact with said peeler surface on one side and with the friction wall on the other side during the operation of the displacement mechanism and to be peeled without being bruised, and wherein the peeling element retains its shape.

17 Claims, 9 Drawing Sheets

(51) Int. Cl.
*A47J 17/00* (2006.01)
*A47J 17/14* (2006.01)
*A23N 15/08* (2006.01)
*A47J 17/18* (2006.01)
*A47J 17/20* (2006.01)
*A23N 7/02* (2006.01)
*A23N 4/04* (2006.01)
*A23N 5/00* (2006.01)
*A47J 43/07* (2006.01)

(52) U.S. Cl.
CPC ............ *A23N 4/04* (2013.01); *A23N 5/002* (2013.01); *A23N 7/00* (2013.01); *A23N 7/02* (2013.01); *A47J 43/0711* (2013.01)

(56) References Cited

U.S. PATENT DOCUMENTS

| | | | | |
|---|---|---|---|---|
| 2,407,819 A | * | 9/1946 | Dolan | A47J 17/20 451/383 |
| 3,961,418 A | * | 6/1976 | Neveu | A47J 17/04 30/123.5 |
| 4,656,936 A | * | 4/1987 | Bardon | A47J 17/18 241/100 |
| 4,768,429 A | * | 9/1988 | Federighi | A47J 17/18 241/199.12 |
| 5,065,672 A | * | 11/1991 | Federighi, Sr. | A47J 17/18 99/623 |
| 5,305,527 A | * | 4/1994 | Holcomb | A47J 17/02 30/123.5 |
| 5,950,529 A | * | 9/1999 | Molloy | A23N 7/02 99/516 |
| 5,996,483 A | * | 12/1999 | Yip | A47J 17/02 99/540 |
| 6,131,508 A | * | 10/2000 | Tsai | A47J 19/06 99/495 |
| 6,968,778 B2 | * | 11/2005 | Karyo | A47J 17/02 30/123.5 |
| 2002/0153440 A1 | * | 10/2002 | Holcomb | A47J 17/02 241/169.1 |

* cited by examiner

GARLIC PEELER

CROSS-REFERENCE TO RELATED APPLICATIONS

This application is a continuation or co-pending U.S. patent application Ser. No. 11/571,921 filed Jan. 10, 2007, which in turn is a U.S. National Phase filing of International Patent Application No. PCT/IL2005/000826, filed Aug. 2, 2005, which is based upon and claims the priority of Israeli Patent Application No. 163363, filed Aug. 5, 2004, now Israeli Patent No. 163363, each of which is incorporated herein by reference in its entirety.

FIELD OF THE INVENTION

The present invention relates to fruit and vegetable peelers and more particularly to a peeler suited for peeling a fine peel/skin from garlic and other fruits and vegetables such as dried union, different dried nuts such as peanuts, almonds, etc.

BACKGROUND OF THE INVENTION

Often the skin of a fruit or a vegetable is dry though in some cases it is not completely dry and is adhered to the fruit or vegetable. In some cases there is only one peel/skin layer (e.g. as in the case of different nuts), and in other eases there are several peel/skins, some of which at dry state and one or more layer which may be in damp state and inner most of which may still be adhered to the fruit or vegetable (e.g. as in the case of garlic, unions and the like).

For sake of simplicity, herein the specification and claims, all such fruits and vegetables are collectively referred to as garlic, though it is to be appreciated that the appliance according to the present invention may be used for peeling a selection of different fruits and vegetables. Furthermore, the terms 'skin' and 'peel' are collectively referred to hereinafter as 'skin'.

Garlic is a member of the onion family, which has been cultivated for thousands of years and is widely used for both its culinary and medicinal attributes, resulting in an ever growing popularity of this crop. Garlic is already mentioned in the old testimony, where it reads: "We remember the fish which we did eat in Egypt for nothing, the cucumbers and the melons and the leeks and the onions and the garlic" (Numbers 11:5).

The increase in consumption of this popular herb raises a need for peeling methods and devices, in particular in light of the strong smell it leaves if it is hand peeled. Thus, several garlic peeling apparatuses have been introduced throughout the years.

A first type of garlic peeler is disclosed GB Patent 2315990 (Beveridge) directed to a non-mechanical gadget in the form of a tube made of resilient material and sized for accommodating a one or more garlic cloves, where an inside surface of the tube is roughened or knurled. Garlic cloves are peeled by introducing them into the tube and manually compressing and rolling the tube over a flat surface.

Another type of garlic peelers is concerned with mechanical or electromechanical apparatuses, as disclosed for example in the following publications:

U.S. Pat. No. 5,996,483 (Yip) discloses a peeler for garlic and/or peanuts including a housing having an open top end and a cylindrical friction will surface on which four ribs having respective surfaces are formed, and a lid for closing the housing top end. The peeler includes a central beater surrounded by the wall surface and supported for rotation about an axis. A handle is provided for rotating the beater so the garlic and/or peanut pieces strike the rib surfaces at a steep angle, whereby the skin of the garlic and/or peanut pieces is cracked open through continued movement by the beater for subsequent peeling.

U.S. Pat. No. 4,768,429 (Federighi) discloses a rotary attachment disposed within the bowl of a food processing appliance in engagement with the drive shaft of the appliance and has a horizontal rotating disk with an abrasive upper surface which quickly removes the dry and brittle outer covering of garlic cloves or similar food ingredients.

U.S. Patent Application 20020153440 (Holcomb et al) discloses a hand-held hand-powered food processor having a pull cord motor for rotating a spindle that carries an arm. The arm can be a cutter blade or an elastomeric flexible peeler arm having a durometer of preferable between Shore 80A and Shore 82A. The arm is driven by the spindle, and there is a stop block formed on a sidewall near the end of the arm. Rotating the spindle causes it to rub against the skin of food in the processor for peeling the food. The cover of the processor has a flat outer periphery so the cover can be used as a storage unit for the contents of the processor.

It is well known that undamaged garlic cloves hardly disperse any odor, however, the typical smell of garlic results due to a chemical reaction that takes place whenever cells are broken, i.e. upon cutting, slicing, grinding etc.

It is an object of the present invention to provide a mechanic peeler for garlic (as well as other fruits and vegetables having a fine skin/peel), though in a non-abrasive fashion, leaving the garlic clove aesthetic and undamaged. The peeler according to the present invention is a simple, easy to operate and clean/wash after use.

SUMMARY OF THE INVENTION

It is provided in accordance with one embodiment, a garlic clove peeler comprising:

a housing formed with a clove receiving compartment formed with a friction wall;

a balloon-like complimentary peeling element made of resilient material and having a shaft that has a rotational axis and that removably connects to the housing, the peeling element being formed with a peeler surface extending adjacent the friction wall and resiliently biased in a direction facing the friction wall wherein said friction wall and said peeler surface are concentric with respect to the rotational axis of the shaft; and a displacement mechanism for rotating one or both of said friction wall and said peeling element about said rotational axis, wherein a gap extends between the peeler surface and the friction wall, wherein the gap is sized so as to snugly receive one or more garlic cloves and to allow the cloves to be carried around in said gap while maintaining contact with said peeler surface on one side and with the friction wall on the other side during, the operation of the displacement mechanism and to be peeled without being bruised, and wherein the peeling element retains its shape.

Furthermore, in accordance with another embodiment, the friction wall is fitted with or made of a resilient material.

Furthermore, in accordance with another embodiment, the displacement mechanism is a manually operated hand-crank.

Furthermore, in accordance with another embodiment, the displacement mechanism is an electric motor, substantially accommodated within the housing.

Furthermore, in accordance with another embodiment, wherein substantially all components thereof are made of plastic material.

Furthermore, in accordance with another embodiment, one or both of the friction wall and the peeling element are fitted with projections and wherein the projections are in the form of bulges or ridges.

Furthermore, in accordance with another embodiment, the housing comprises a top cover fixable over a base member, both made of a rigid material, said top cover supporting the peeling element projecting towards the friction wall.

Furthermore, in accordance with another embodiment, the friction wall is an inner liner of the base member.

Furthermore, in accordance with another embodiment, the friction wall is integrally molded with the base member.

Furthermore, in accordance with another embodiment, the peeling element is retained by a retention ring articulated to a top cover.

Furthermore, in accordance with another embodiment, the peeling element is detachable from the top cover.

Furthermore, in accordance with another embodiment, one or both of the friction wall and the peeling element are deformable to snugly receive a garlic clove there between.

Furthermore, in accordance with another embodiment, when both the friction wall and the peeling element rotate, the friction wall and the peeling element rotate in opposed directions.

Furthermore, in accordance with another embodiment, the size of the gap is adjustable so as to comply with different fruit/vegetable sizes.

Furthermore, in accordance with another embodiment, one or both of the friction wall and the peeling element are replaceable.

Furthermore, in accordance with another embodiment, the peeler element is rotatably retained within the housing.

Furthermore, in accordance with another embodiment, rotation of the peeler element is imparted by a power unit fitted at a cover or at a base member, the cover or base member having an axle extending there from an supporting the peeler element.

BRIEF DESCRIPTION OF THE DRAWINGS

In order to understand the invention and to see how it may be carried out in practice, some embodiments will now be described, by way of non-limiting examples only with reference to the accompanying drawings, in which:

FIG. 2 is top isometric exploded view of the garlic peeler seen in FIG. a;

DETAILED DESCRIPTION OF THE INVENTION

Figure 1:
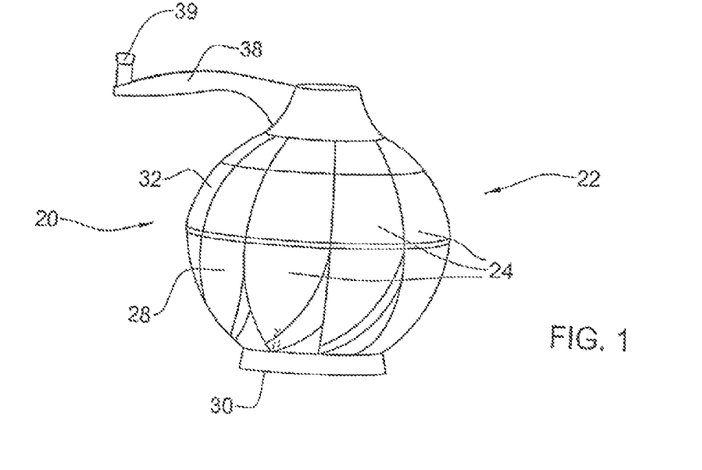
FIG. 1 is an isometric view of a manually operable garlic peeler according to an embodiment of the present invention.
Figure 2:
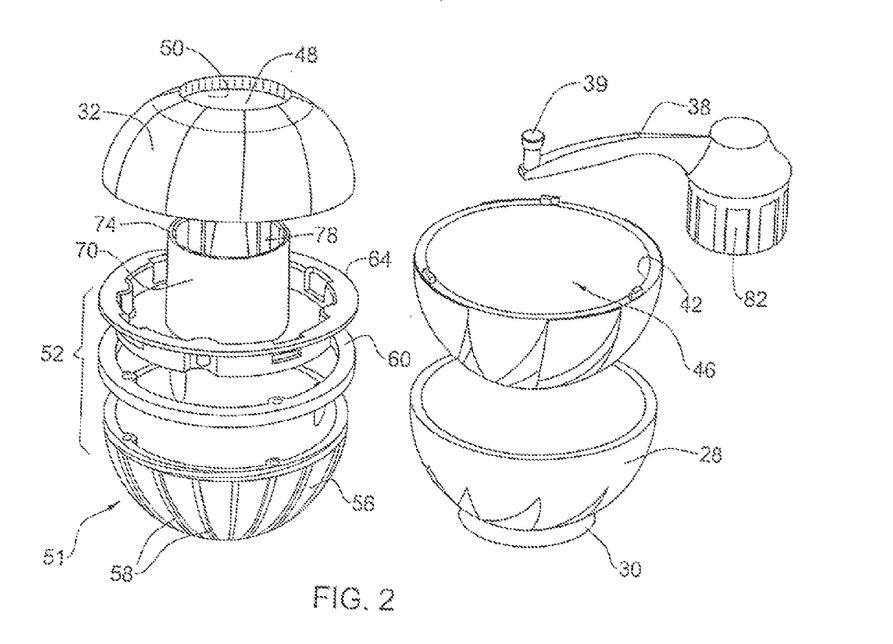

Referring first to FIGS. 1 and 2 of the drawings there is illustrated a garlic peeler in accordance with the present invention and generally designated 20 comprising a housing 22 having the general appearance of a sphere in the shape of garlic with an ornamental design resembling garlic cloves at 24. The housing 22 comprises a base member 28 funned with a flat support base 30 and a complementary top cover 32, the detailed construction of both will become apparent hereinafter with reference to FIGS. 3 and 4. The top cover 32 is lockingly engageable with the base member 28. A manually operated hand crank 38 is provided, operation of which will become apparent hereinafter as well.

Figure 3:
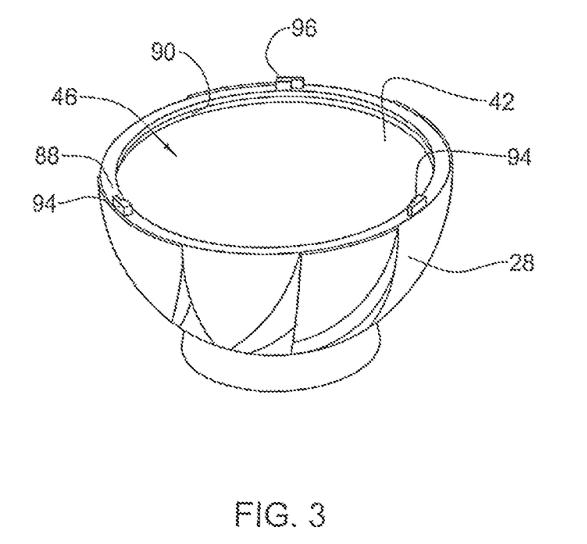
FIG. 3 is a top isometric view of a base member of the garlic peeler seen in FIG. 1.
Figure 4:
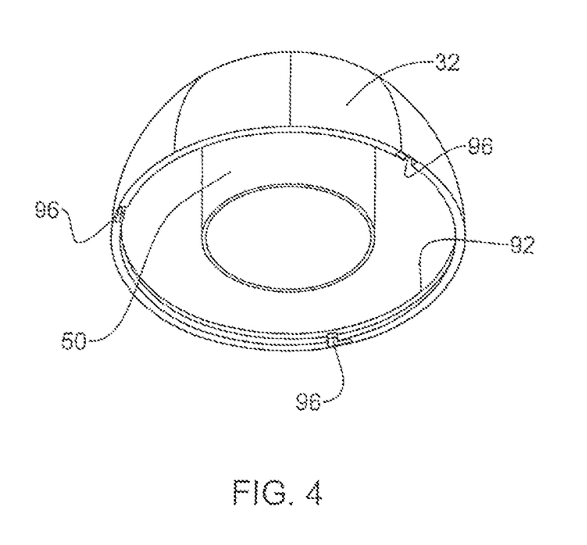
FIG. 4 is a bottom isometric view of a top cover of the garlic peeler seen in FIG. 1.

As can best be seen in FIGS. 2 and 3, the base member 28 is in the form of a rigid hemisphere snugly accommodating a liner 42 made of resilient material, e.g. silicone rubber, and constituting a frication surface. In accordance with a particular embodiment of the invention the liner 42 is integrally molded into the base member 28 to thus impart the colorful, multilayered appearance as illustrated in FIGS. 1, 3, 8B and 9. However, it is apparent that the liner 42 may be packed in the base 28 and fixedly received, e.g. by a snap-type arrangement, a fixation ring, etc. (not shown).

Figures 7A, 7B:
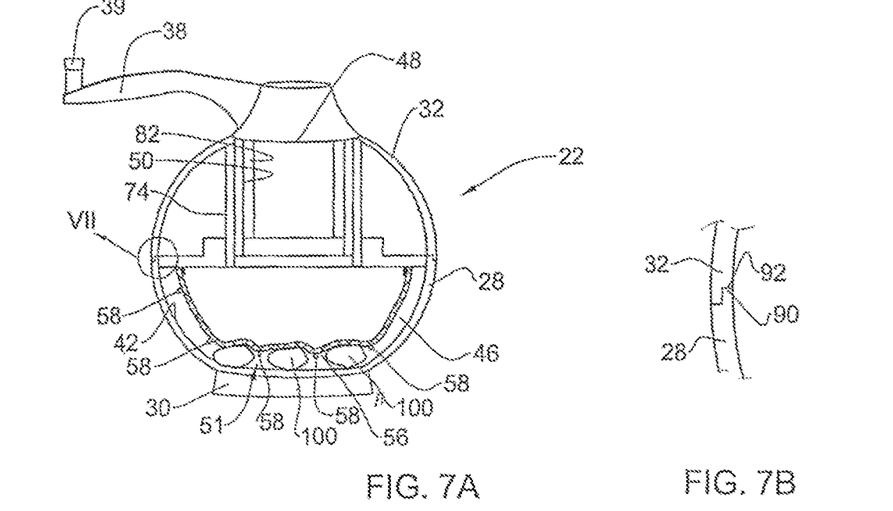
FIG. 7A is a longitudinal section of a peeler according to the invention, with garlic cloves received in the clove receiving compartment.
FIG. 7B is an enlargement of the portion marked VII in FIG. 7A.

Base member 28 with the friction wall (liner) 42 give rise to a clove receiving compartment 46 (see also FIG. 7A).

The top cover 32 is in the form of a rigid hemisphere complementary with the base member 28 and formed at its top with an aperture 48 (FIG. 2) from which downwardly extends a cylindrical wall portion 50 having both ends opened. A peeling assembly generally designated 52 (FIGS. 2, 5, 6A and 6B) comprises a peeling element 51 formed with a peeler surface 56 in the form of an inverted hemisphere made of a resilient material (such as silicon rubber). The peeling element 51 is formed at its outer surface with a plurality of radial ribs 58. The peeler element 51 is supported by a retention ring 60 made of rigid material (e.g. plastic material) articulated to the peeler element 51 either by screws at 62 or by integrally molding thereof, or by other means, e.g. adhering, etc. The rigid retention ring 60 is snappingly hut detachably articulated to a rotation support disk 64 by means of inward projecting radial tabs 68 of retention ring 60 snappingly engaged into corresponding recesses 70 formed in support disk 64.

Figure 5:
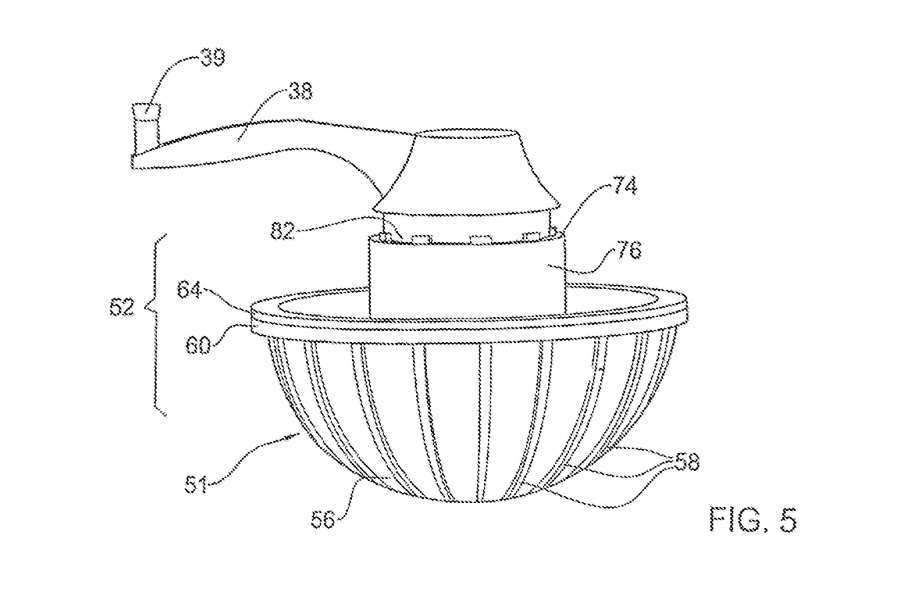
FIG. 5 is a side view of a peeling assembly articulated to a rotation handle of the garlic peeler seen in FIG. 1.
Figures 6A, 6B:
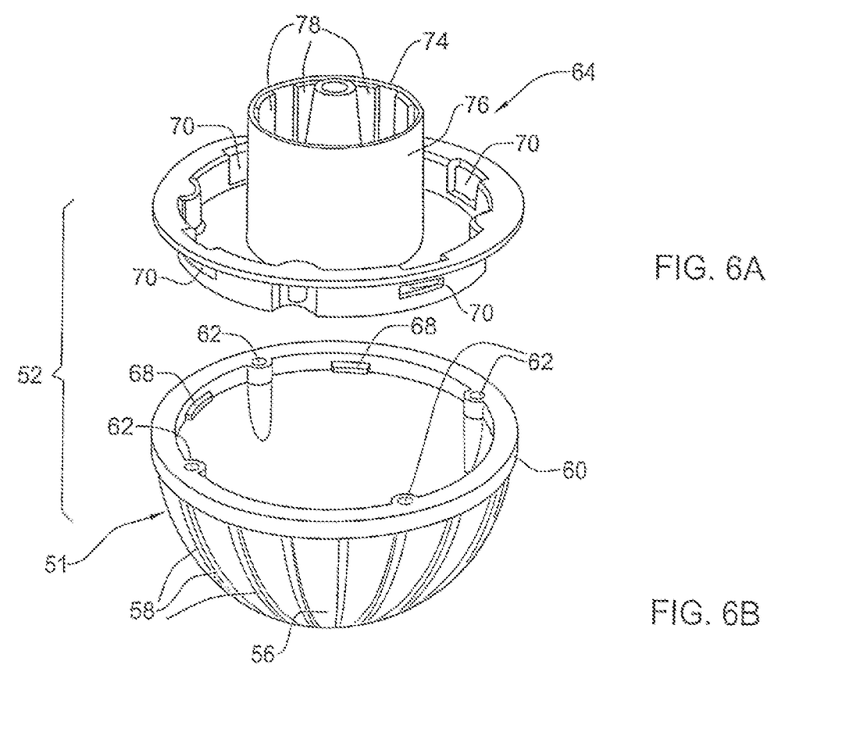
FIG. 6A is amp isometric view of a coupling member of a peeling assembly according to an embodiment of the present invention.
FIG. 6B is a peeling member of a peeling assembly according to an embodiment of the present invention.

Support disk 64 is formed with an upwardly extending cylindrical neck portion 74 with a smooth external surface 76 sized for snugly though free rotation within cylinder 50 of the top cover 32, whilst its inner surface is formed with a plurality of axially extending radial ribs 78 fitted for snap engagement with a cogged shank portion 82 of the hand crank 38 fitted for rotary engagement thereof as in the position of FIGS. 1, 5 and 7A.

As already mentioned above, and with particular reference to FIGS. 3, 4, 7A and 7B, the top cover 32 is fitted for locking engagement with the base member 28. For that purpose, base member 28 is formed at its upper edge 88 with a circumferential rim 90 whilst the top cover 32 is formed with a circumferential inner groove 92 and further, base member 28 is formed with several locking lugs 94 engagable with corresponding recesses 96 formed in the top cover 32. In this fashion, the top cover 92 is lockingly engageable with the base member 28 to thereby prevent unintentional opening of the utensil while in use.

As can best be seen in FIG. 7A, at the assembled position the peeling element 51 forms a gap 46 from the liner 42, said gap typically being in the range of about 5 to 10 mm which in average is smaller than the size of a garlic clove (100 in FIG. 7A) such that at the assembled position the peeling element 51 deforms to ensure engagement and friction contact over the garlic cloves 100. Rotation of hand crank 38 by knob 39 entails corresponding rotation of the peeler element 51, resulting in peeling/brushing of the skin of the garlic cloves 100 placed within the gap 46, however without causing any damage to the garlic cloves, i.e. without abrading, scratching, smashing, or any other damage. In this way, an eye-pleasing peeled garlic clove is obtained, whilst retaining all its nutritive values and even more so substantially without disbursing of the typical garlic smell.

Whilst the description here in the specification and claims makes reference to garlic, it is to be appreciated that the appliance may just as well be used for peeling other vegetables or fruits, e.g. onions, different types of nuts (almonds, peanuts, etc.) and others. Accordingly, the size of the gap, namely the distance between the friction wall (liner) 42 of the base member 28 and the peeler surface 56 of peeling element 51 may be differ according to the size of the vegetable or fruit under consideration. According to a particular design, not shown, the gap may be regulated by displacement of the peeling element or replacing it.

It is further appreciated that, the appliance is easily assembled and disassembled for cleaning and maintenance, and is easily washable, even by dishwashing machines. Typically, all components of the appliance are made of plastic and elastomeric materials which are easily washable and which do not absorb any odors or color.

Figure 8A:
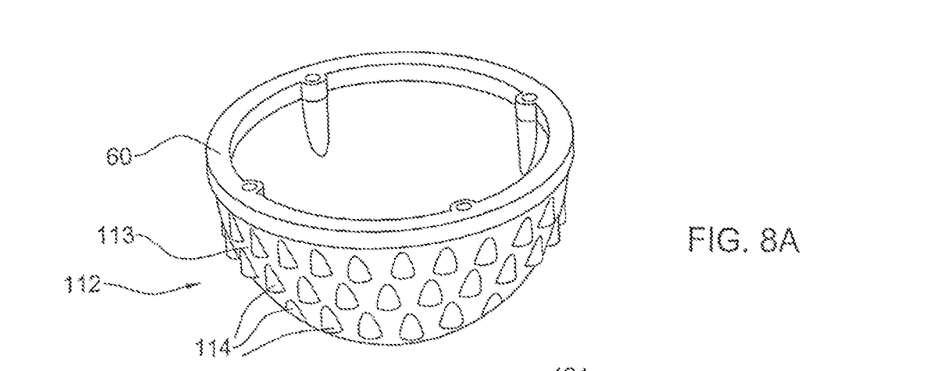
FIG. 8A is a bottom isometric view of a peeling member according to an embodiment of the present invention.

Turning now to FIG. 8A, there is illustrated a peeling element 112 fitted with a retention ring 60 as in the previous embodiment. However, in the embodiment of FIG. A, the peeler surface of the peeler element 112 is formed with a plurality of bulges 114 for increasing friction contact with the garlic clove received within the clove receiving compartment.

Figure 8B:
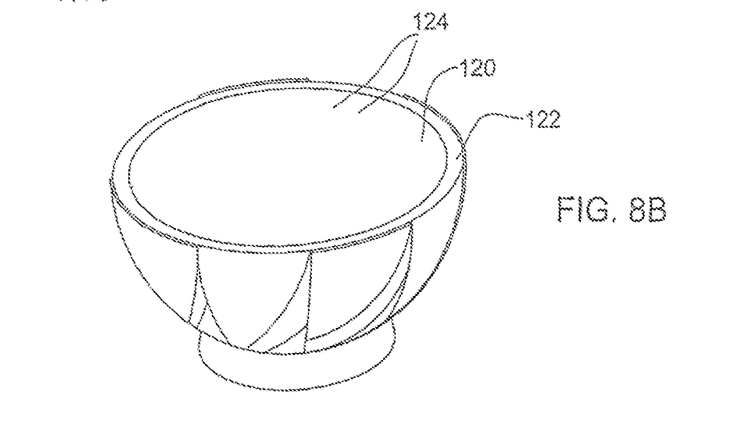
FIG. 8B is atop isometric view of a base member according to an embodiment of the present invention.

In the embodiment of FIG. 8B, the inner surface of friction wall 120 of the base member 122 is fitted with a plurality of resilient bristles 124 also for the purpose of increasing friction engagement with a garlic clove received within the clove receiving compartment. It is appreciated that either or both of the friction wall (liner of the base member) and the peeler surface of the peeling element may be either smooth or fitted with projections such as bulges or ribs, etc, or with bristles or with a combination thereof.

It is further appreciated that the same housing may be used, however, with a replaceable peeler element for adjusting to different fruits and vegetables.

Figure 9:
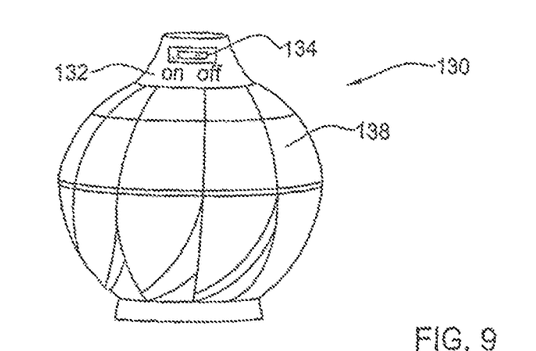
FIG. 9 is an isometric view of an electrical garlic peeler according to an embodiment of the present invention.

In the embodiment of FIG. 9, the garlic peeler 130 is fitted with an electric motor 132, in replacement of the manual hand crank 38 in the previous embodiments. The electric motor 132 is fitted with an on/off switch 134 and the motor and batteries may be received within the space of the cylindrical portion extending downwards from the top cover 138.

Figure 10:
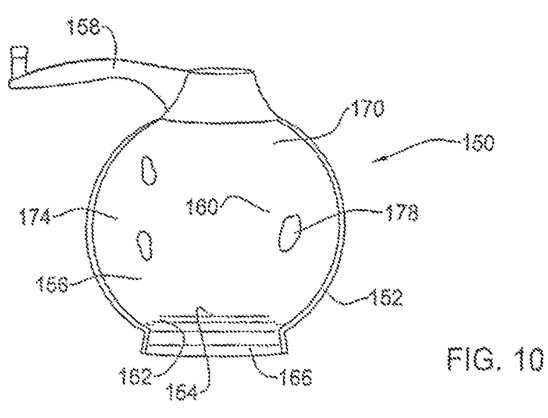
FIG. 10 is a longitudinal section of a garlic peeler according to a modification thereof.

In the embodiment of FIG. 10, there is illustrated a garlic peeler in accordance with still another embodiment of the present invention, generally designated 150. In this embodiment, the housing is a complete rigid housing 152 formed with a vertically extending cylindrical friction wall 156 made of resilient material substantially coaxially within the housing 152. A rotary hand crank 158 is engageable with a rigid core 160 which at the assembled position is rotatably supported at its lower end 162 by an axial projection 164 projecting, from a base 166 of housing 152. The core 160 is coated with a resilient sleeve 170 constituting a peeler surface, whereby a clove receiving gap 174 extends between the resilient sleeve 170 and the liner 156. The clove receiving gap 174 is typically narrower than the size of an average garlic clove 178 whereupon rotation of the hand crank 158 entails peeling the garlic clove 178.

It is appreciated that other embodiments as mentioned in connection with previous applications are possible as well, e.g. forming the peeler surface, of the sleeve and/or friction wall 156 with projections or bristles, etc.

Figure 11:
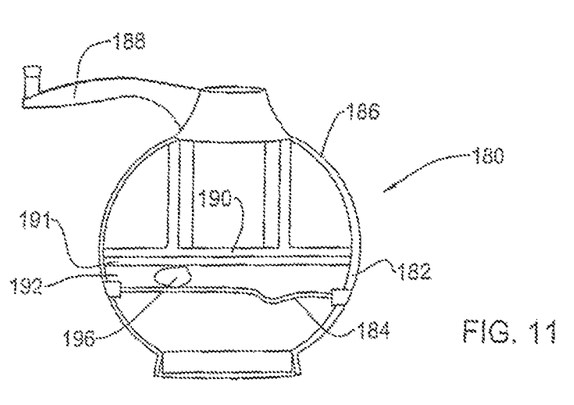
FIG. 11 is a longitudinal section of a garlic peeler according to another modification thereof.

In the embodiment of FIG. 11, there is illustrated a garlic peeler according to a modification of the invention and generally designated 180 wherein a base member 182 is formed with a resilient peeling element 184 in the form of a diaphragm tensioned about its periphery whilst the top cover 186 supports the rotary hand crank 188 which in turn supports a disk 190, coated by a friction surface 191 made of a resilient material, giving rise to a clove receiving gap 192 extending between the peeler surface 184 and the friction surface 191, said gap 192 constituting the clove receiving compartment.

The arrangement is such that rotation of handle 188 entails corresponding rotation of the disk 190, resulting in peeling/brushing off the peel off a garlic clove 196 received within the clove receiving gap 192.

Figure 12:
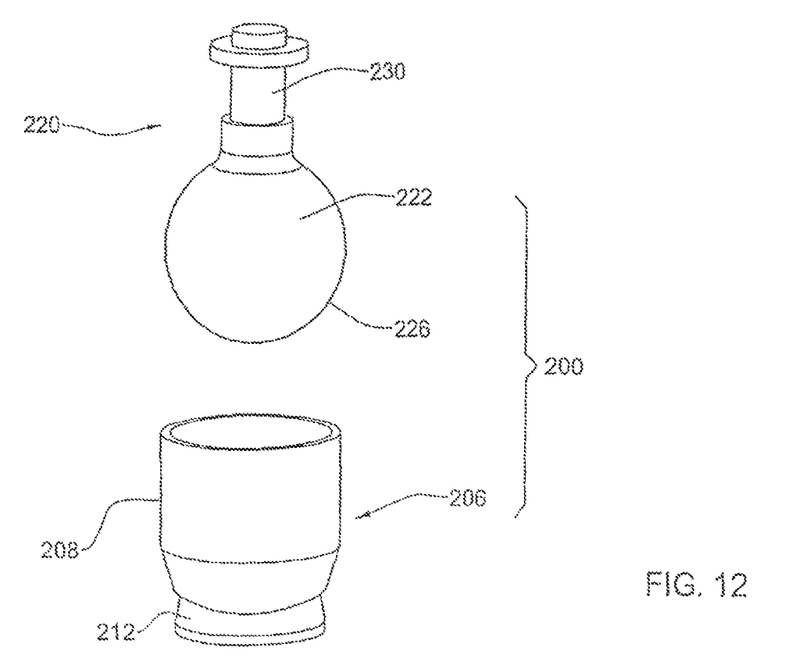
FIG. 12 is an exploded isometric view of a garlic peeler according to a different embodiment of the present invention.
Figure 13:
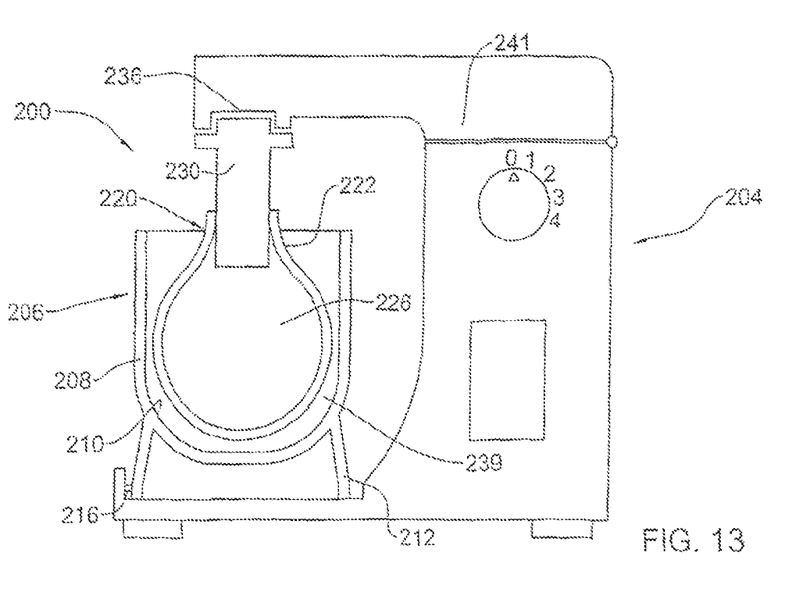
FIG. 13 is a longitudinal section through a garlic peeler according to the embodiment of FIG. 12, fitted on a mixer in an operable state.

With further reference now made to FIGS. 12 and 13 there is illustrated a garlic clove peeler generally designated 200 adapted for use with a mixer, e.g. a domestic kitchen mixer 204 as in FIG. 13. The garlic peeler 200 comprises bowl 206 formed with a hemispheric bottom portion 208, which according to one particular design at least the hemispheric bottom portion 208 is fitted or coated with a resilient liner 210 serving as a friction wall (FIG. 13). The bowl is a replacement bowl for the mixer and thus is provided with a base 212 for securing to the mixer's support table 216 (FIG. 13). A peeling element 220 comprising a balloon 222, at least a bottom hemispheric portion thereof 226 made of a resilient material and sized and shaped to it into said bowl 206. The peeling element 220 further comprises a shank 230 fitted for coupling to the mixer's chuck 236 for rotational coupling thereof.

According to this embodiment, the garlic peeler 200 is an add-on type for utilizing with a conventional mixer, wherein the bowl 206 may serve also for other purposes used in conjunction with the mixer 204, as known per se. The arrangement is such that rotary motion is imparted to the peeling element from the motor of mixer 204. In this case, the size of the gap 239 between the bowl and the peeling element 220 may be adjusted by lowering or raising the mixers arm 241 and further, the rotation speed is governed by a controller 245.

The shank 20 may be a specially design element, as in the figures, or it may be any one of a conventional mixing utensils used in conjunction with a mixer, wherein the peeling element is articulated thereto.

Figure 14:
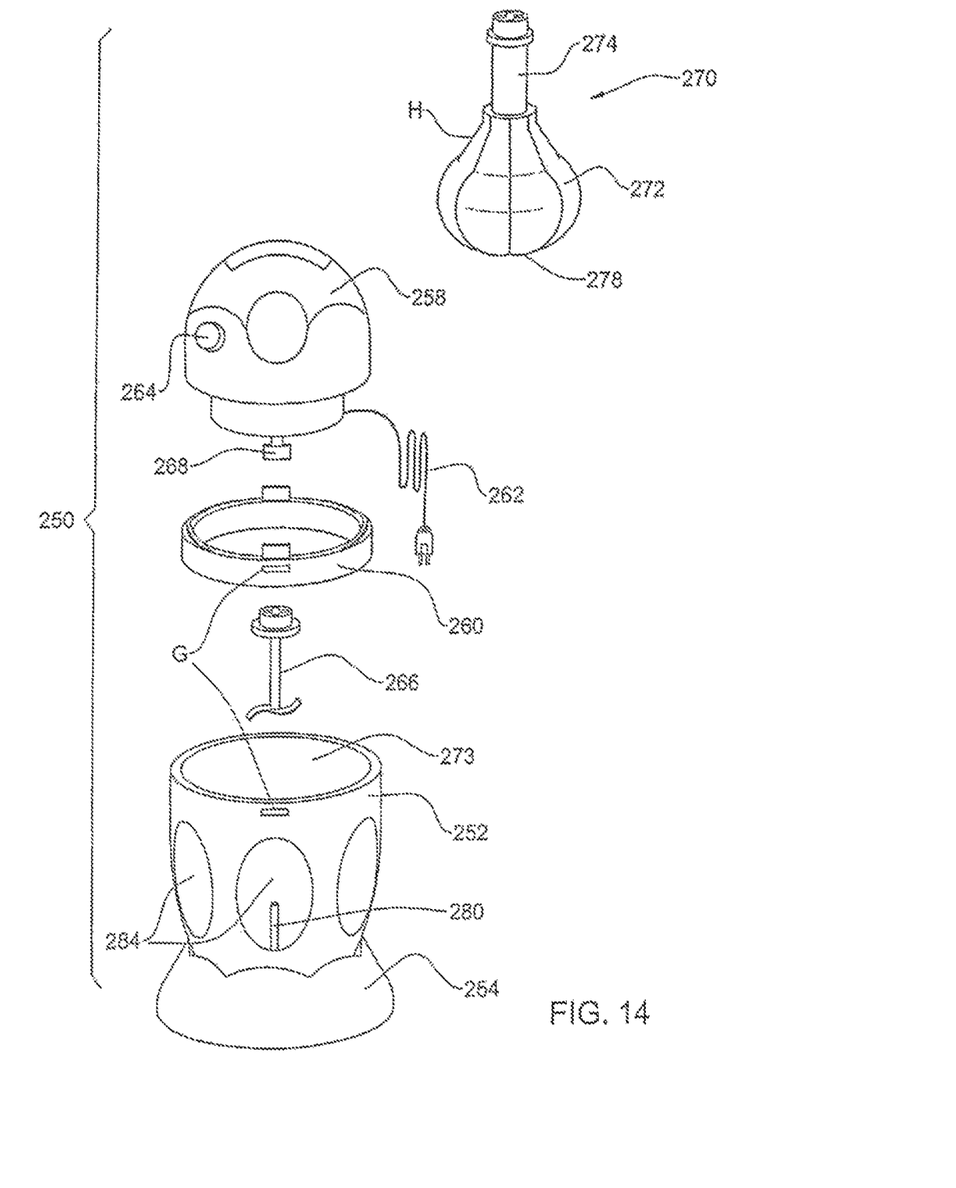
FIG. 14 is an exploded isometric view of a food processor device fitted with a peeling accessory according to the present invention.
Figure 15:
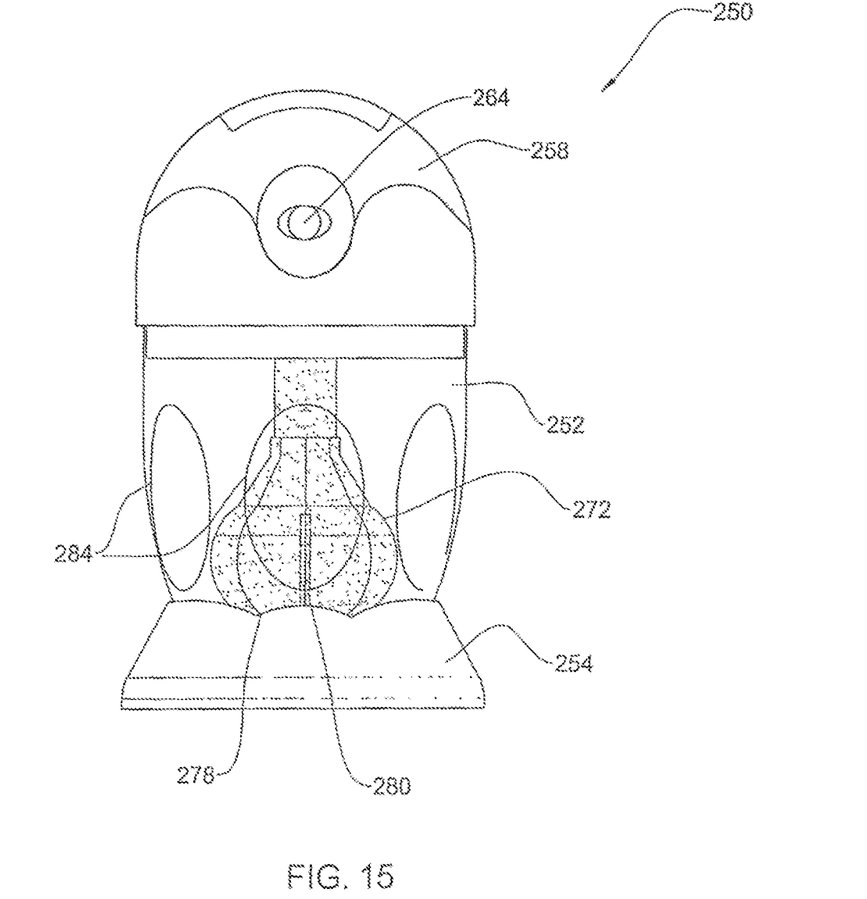
FIG. 15 is a side view of the food processor of FIG. 14, assembled in its peeler configuration.
Figure 16A:
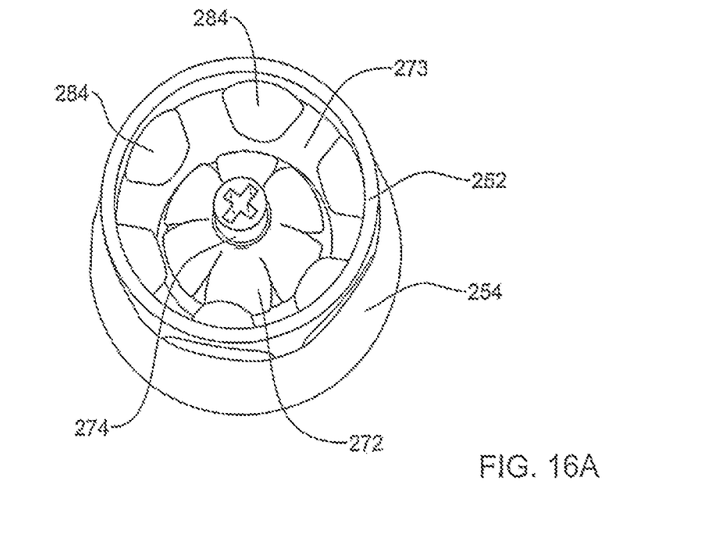
FIGS. 16A and 16B are top and side views, respectively of the peeler element received within the bowl of the device of FIG. 14.
Figure 16B:
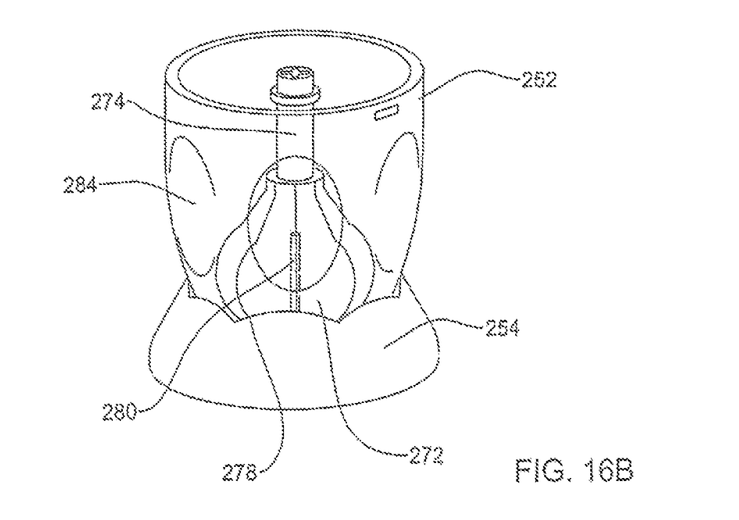

With further reference made to FIGS. 14 to 16, a modification of the invention is illustrated. Accordingly, there is provided a food processor generally designated 50 comprising a housing constituted of a food receiving member 252 in the form of as bowl supported over an integral base member 254 and a top member 258 fitted for locking engagement over the bowl 252 via an adaptor cover member 260. Integrated within the top member 258 there is an electric motor (not seen) connectable to the power supply by an electric cord 262 and operable by an electric switch 264, as known per se.

A plurality of replaceable accessories are provided, of which only two are shown in the present embodiment. Such embodiments are, for example, a chopper, a grinder, a slicer, mincer, mixer, etc. In FIG. 14 there is illustrated a chopper accessory 266 which is connectable to a shank 268 extending from the motor. Another accessory is the garlic peeler 270 comprising a resilient balloon-like peeling element 272 extending from a support shank 274 adapted for articulation to shank 268 so that at the assembled position (FIG. 15) the peeler element 272 extends within the bowl 252 with a bottom end 278 of the peeler element rotatably supported by a bearing member 280 fitted within the bowl 252.

It is further noticed that the bowl 252 is formed with a plurality of inwardly extending depressions 284 and that the gap extending between the inside surface of the receiving compartment (bowl 252) and the balloon-like peeling element 272 differs along its longitudinal contour between to tighter gap at a bottom portion thereof and a broader gap at an upper portion thereof.

The balloon-like peeling element 272 may be a homogenous solid unit made of resilient material or may be a sealed balloon retaining its shape. However, in accordance with a modification thereof, the balloon may be aired and may further be removable from shank 274, e.g. for purposes of cleaning.

In use, dry garlic cloves are placed in the howl 252 and then the device is closed by placing the cover member 260 and the top cover 258. Upon starting the electric motor by switch 264, the peeler element 274 is rotated within the bowl causing the garlic cloves to displace within the receiving compartment whereby friction between the peeler element 279 and the inner surface 273 of bowl 252 results in peeling the garlic clove.

It is appreciated that the above descriptions are intended only to serve as examples and that many other embodiments are possible, all of which fall within the spirit and the scope of the present invention.

The invention claimed is:

1. A garlic clove peeler comprising:
   a housing formed with a clove receiving compartment formed with a friction wall;
   a complimentary peeling element comprising a balloon having a bottom hemispheric portion made of resilient material and having a shaft that has a rotational axis and that removably connects to the housing, the peeling element being formed with a peeler surface extending adjacent the friction wall and resiliently biased in a direction facing the friction wall wherein said friction wall and said peeler surface are concentric with respect to the rotational axis of the shaft; and
   a displacement mechanism for rotating one or both of said friction wall and said peeling element about said rotational axis, wherein a gap extends between the peeler surface and the friction wall, wherein the gap is sized so as to snugly receive one or more garlic cloves and to allow the cloves to be carried around in said gap while maintaining contact with said peeler surface on one side and with the friction wall on the other side during the operation of the displacement mechanism and to be peeled without being bruised, and wherein the peeling element retains its shape.

2. The garlic clove peeler according to claim 1, wherein the friction wall is fitted with or made of a resilient material.

3. The garlic clove peeler according to claim 1, wherein the displacement mechanism is a manually operated hand-crank.

4. The garlic clove peeler according to claim 1, wherein the displacement mechanism is an electric motor, substantially accommodated within the housing.

5. The garlic clove peeler according to claim 1, wherein substantially all components thereof are made of plastic material.

6. The garlic clove peeler according to claim 1, wherein one or both of the friction wall and the peeling element are fitted with projections and wherein the projections are in the form of bulges or ridges.

7. The garlic clove peeler according to claim 1, wherein the housing comprises a top cover fixable over a base member, both made of a rigid material, said top cover supporting the peeling element projecting towards the friction wall.

8. The garlic clove peeler according to claim 7, wherein the friction wall is an inner liner of the base member.

9. The garlic clove peeler according to claim 7, wherein the friction wall is integrally molded with the base member.

10. The garlic clove peeler according to claim 1, wherein the peeling element is retained by a retention ring articulated to a top cover.

11. The garlic clove peeler according to claim 10, wherein the peeling element is detachable from the top cover.

12. The garlic clove peeler according to claim 1, wherein one or both of the friction wall and the peeling element are deformable to snugly receive a garlic clove there between.

13. The garlic clove peeler according to claim 1, wherein when both the friction wall and the peeling element rotate, the friction wall and the peeling element rotate in opposed directions.

14. The garlic clove peeler according to claim 1, wherein the size of the gap is adjustable so as to comply with different fruit/vegetable sizes.

15. The garlic clove peeler according to claim 1, wherein one or both of the friction wall and the peeling element are replaceable.

16. The garlic clove peeler according to claim 1, wherein the peeler element is rotatably retained within the housing.

17. The garlic clove peeler according to claim 16, wherein rotation of the peeler element is imparted by a power unit fitted at a cover or at a base member, the cover or base member having an axle extending there from and supporting the peeler element.

* * * * *